United States Patent
Matsushita et al.

(10) Patent No.: US 10,161,754 B2
(45) Date of Patent: Dec. 25, 2018

(54) DRIVING ASSISTANCE SYSTEM AND DRIVING ASSISTANCE METHOD

(71) Applicants: Nissan Motor Co., Ltd., Kanagawa (JP); The University of Tokyo, Tokyo (JP)

(72) Inventors: Akihiro Matsushita, Kanagawa (JP); Takashi Sunda, Kanagawa (JP); Yoshihiko Nakamura, Tokyo (JP); Wataru Takano, Tokyo (JP); Jun Hashimoto, Tokyo (JP)

(73) Assignees: NISSAN MOTOR CO., LTD., Kanagawa (JP); The University of Tokyo, Tokyo (JP)

( * ) Notice: Subject to any disclaimer, the term of this patent is extended or adjusted under 35 U.S.C. 154(b) by 88 days.

(21) Appl. No.: 14/415,162

(22) PCT Filed: Jul. 16, 2013

(86) PCT No.: PCT/JP2013/069294
§ 371 (c)(1),
(2) Date: Jan. 16, 2015

(87) PCT Pub. No.: WO2014/013985
PCT Pub. Date: Jan. 23, 2014

(65) Prior Publication Data
US 2015/0211868 A1    Jul. 30, 2015

(30) Foreign Application Priority Data
Jul. 17, 2012   (JP) ................................ 2012-158314

(51) Int. Cl.
*G01C 21/32*    (2006.01)
*G08G 1/16*    (2006.01)
(Continued)

(52) U.S. Cl.
CPC ......... *G01C 21/32* (2013.01); *G01C 21/3638* (2013.01); *G08G 1/166* (2013.01);
(Continued)

(58) Field of Classification Search
CPC .. G01M 99/008; G01M 13/045; G01M 15/12; G01R 19/2513
See application file for complete search history.

(56) References Cited

U.S. PATENT DOCUMENTS 7,783,417 B2 * 8/2010 Vavrus ......................... 701/423
8,229,169 B2   7/2012 Nakamura et al.
(Continued)

FOREIGN PATENT DOCUMENTS

DE   102009007950 A1   10/2009
DE   102010048263 A1    5/2011
(Continued)

OTHER PUBLICATIONS

Written Opinion for corresponding International Application No. PCT/JP2013/069294, dated Oct. 22, 2013 (4 pages).
(Continued)

*Primary Examiner* — Jelani A Smith
*Assistant Examiner* — Paul A Castro
(74) *Attorney, Agent, or Firm* — Osha Liang LLP

(57) ABSTRACT

A driving assistance system has a driving information acquisition unit that acquires any of an amount of operations by a driver, a vehicle behavior, a state of the driver, and information regarding the environment surrounding a vehicle as driving information, a vehicle location information acquisition unit that acquires vehicle location information, a statistical information generation unit that generates statistical information by statistically processing the driving information as a time-series pattern, an information associating unit that associates the statistical information with the
(Continued)

vehicle location information at the time of the acquisition of the driving information, an information reference unit that references and reads the statistical information based on the location information acquired by the vehicle location information acquisition unit, a driving assistance unit that performs driving assistance based on the statistical information read by the information reference unit, and a communication unit.

7 Claims, 14 Drawing Sheets

(51) Int. Cl.
　　*G09B 29/10*　　(2006.01)
　　*G01C 21/36*　　(2006.01)
　　*G08G 1/01*　　(2006.01)
　　*B60W 50/00*　　(2006.01)

(52) U.S. Cl.
　　CPC ..... *G09B 29/106* (2013.01); *B60W 2050/008* (2013.01); *B60W 2050/0078* (2013.01); *B60W 2050/0079* (2013.01); *B60W 2050/0089* (2013.01); *B60W 2540/00* (2013.01); *B60W 2550/402* (2013.01); *G08G 1/0112* (2013.01); *G08G 1/0129* (2013.01)

(56) References Cited

U.S. PATENT DOCUMENTS

| | | |
|---|---|---|
| 2004/0128066 A1 | 7/2004 | Kudo et al. |
| 2007/0038372 A1 | 2/2007 | Kudo et al. |
| 2009/0005929 A1* | 1/2009 | Nakao .............. B60T 7/22 |
| | | 701/33.4 |
| 2011/0035147 A1* | 2/2011 | Kimishima ............ 701/201 |
| 2011/0210867 A1 | 9/2011 | Benedikt |
| 2011/0258044 A1* | 10/2011 | Kargupta ............ 705/14.49 |

FOREIGN PATENT DOCUMENTS

| | | |
|---|---|---|
| EP | 2017774 A2 | 1/2009 |
| JP | 11-321690 A | 11/1999 |
| JP | 2005-196567 A | 7/2005 |
| JP | 4027838 B2 | 12/2007 |
| JP | 2008-250687 A | 10/2008 |
| JP | 2008-292498 A | 12/2008 |
| JP | 2009-006946 A | 1/2009 |
| JP | 2011-134207 A | 7/2011 |

OTHER PUBLICATIONS

International Search Report for corresponding International Application No. PCT/JP2013/069294, dated Oct. 22, 2013 (2 pages).
International Preliminary Report on Patentability for corresponding International Application No. PCT/JP2013/069294, dated Jul. 8, 2014 (7 pages).

* cited by examiner

Time (s)

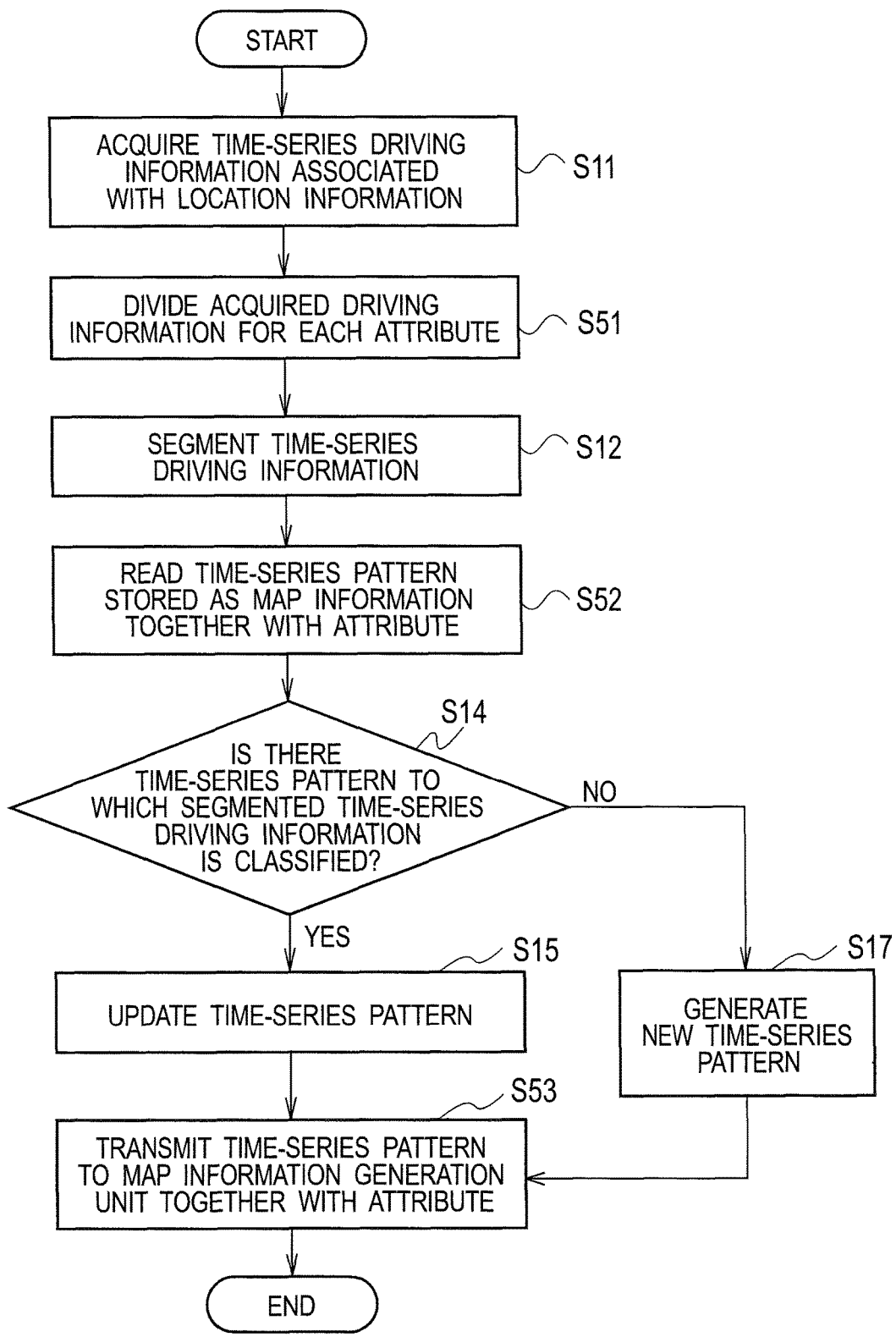

DRIVING ASSISTANCE SYSTEM AND DRIVING ASSISTANCE METHOD

CROSS-REFERENCE TO RELATED APPLICATIONS

The present application claims priority to Japanese Patent Application P2012-158314, filed on Jul. 17, 2012, the contents of which are incorporated herein by reference in its entirety.

BACKGROUND

Technical Field

The present invention relates to a driving assistance system and a driving assistance method for assisting driving of a vehicle.

Related Art

As a technology to collect information of traffic environment during driving with an imaging device and the like mounted on a vehicle, there has heretofore been a map information collection device described in Patent Literature 1 below, for example.

The map infatuation collection device performs image recognition processing to collect information contained in a vehicle surrounding image acquired by the imaging device mounted on the vehicle. Also, the map information collection device suppresses the influence of errors in recognition position by statistical learning when image information of the same place is recognized more than once.

The map information collection device described above acquires information by image recognition and performs statistical learning when similar image information is recognized more than once at the same place. Therefore, time-varying dynamic traffic environment information, such as movement of the own vehicle or other vehicles therearound, cannot be statistically generated as map information.

CITATION LIST

Patent Literature

Patent Literature 1: Japanese Patent Application Publication No. 2008-250687 (U.S. Pat. No. 4,569,837)

SUMMARY

Therefore, one or more embodiments of the present invention provides a driving assistance system and a driving assistance method capable of acquiring time-varying information and providing the acquired information for driving assistance.

According to one or more embodiments of the present invention, driving information is acquired, and map information is generated and updated by associating statistical information obtained by statistically processing the driving information as a time-series pattern with vehicle location information when the driving information is acquired. To perform driving assistance, map information is referenced and read based on the vehicle location information. The driving assistance is performed based on the read map information.

A driving assistance system comprises a driving information acquisition unit that acquires any of an amount of operations by a driver, a vehicle behavior, a state of the driver, and information regarding the environment surrounding a vehicle as driving information; a vehicle location information acquisition unit that acquires vehicle location information; a statistical information generation unit that generates statistical information by statistically processing the driving information as a time-series pattern; an information associating unit that associates the statistical information with the vehicle location information at the time of the acquisition of the driving information; an information reference unit that references and reads the statistical information based on the location information acquired by the vehicle location information acquisition unit; a driving assistance unit that performs driving assistance based on the statistical information read by the information reference unit; and a communication unit that transmits and receives information to and from a communication device outside the vehicle. The driving information acquisition unit provides the information acquired by the communication unit to the statistical information generation unit as the driving information for using the information acquired by the communication unit as the driving information.

A driving assistance method comprises acquiring any of an amount of operations by a driver, a vehicle behavior, a state of the driver, and information regarding the environment surrounding a vehicle as driving information, and acquiring vehicle location information; generating statistical information by statistically processing the driving information as a time-series pattern; associating the statistical information with the vehicle location information at the time of the acquisition of the driving information; referencing and reading the statistical information based on the acquired vehicle location information; performing driving assistance based on the read statistical information; and providing the information acquired by a communication unit configured to transmit and receive information to and from a communication device outside the vehicle as the driving information at generating the statistical information for using the information acquired by the communication unit as the driving information.

BRIEF DESCRIPTION OF DRAWINGS

FIG. 17 is a flowchart showing processing of generating statistical information for each of the attributes of the driving information in the driving assistance system described as the fourth embodiment of the present invention.

DETAILED DESCRIPTION

With reference to the drawings, embodiments of the present invention are described below. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

[First Embodiment]

Figure 1:
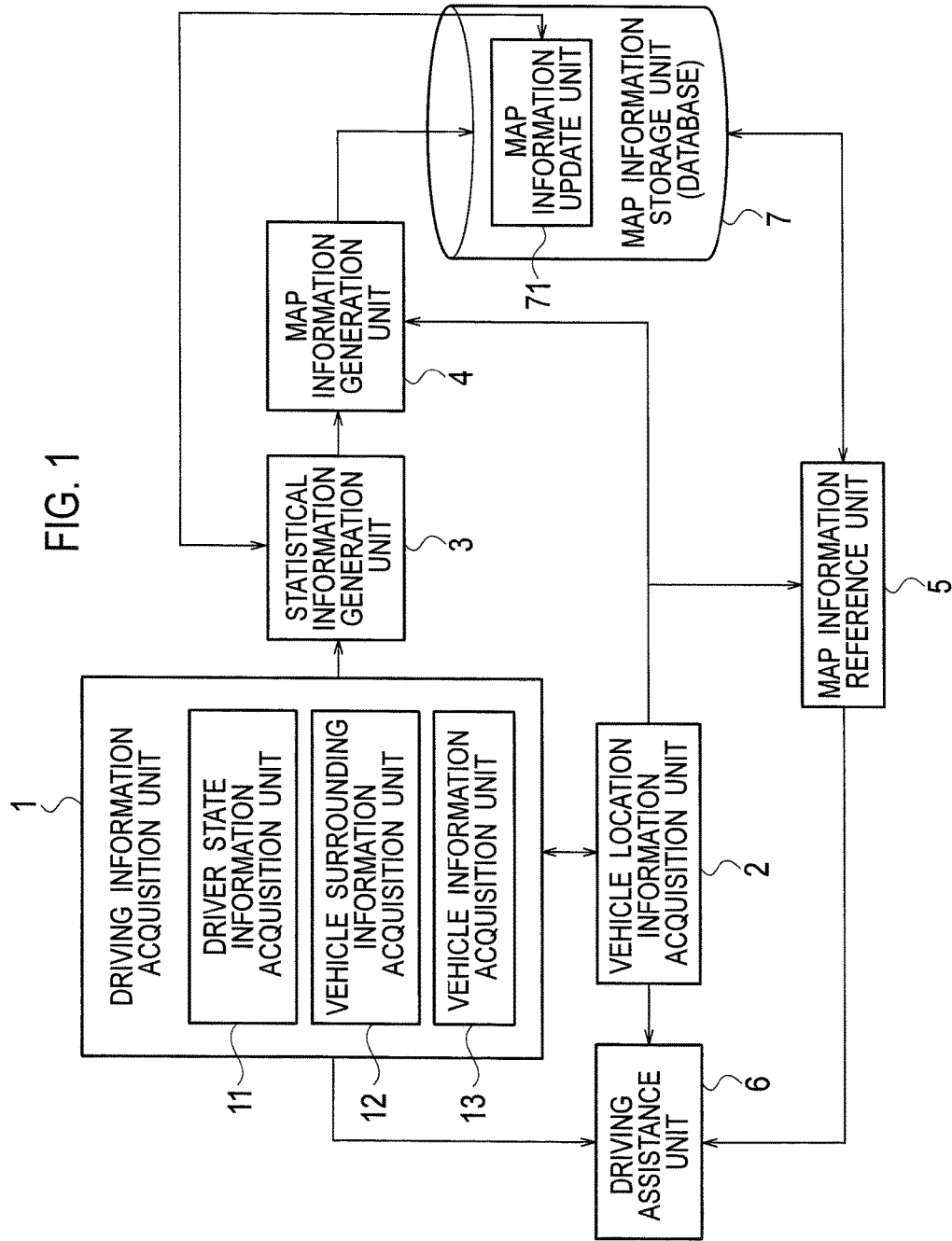
FIG. 1 is a block diagram showing a configuration of a driving assistance system described as a first embodiment of the present invention.

A driving assistance system to be described as a first embodiment of the present invention has a configuration as shown in FIG. 1, for example. As shown in FIG. 1, the driving assistance system includes a driving information acquisition unit 1, a vehicle location information acquisition unit 2, a statistical information generation unit 3, a map information generation unit 4, a map information reference unit 5, a driving assistance unit 6, and a map information storage unit 7.

Note that, although a part of the driving assistance system is actually configured using a ROM, a RAM, a CPU and the like, functions that can be realized by the CPU performing processing according to a driving assistance program stored in the ROM are described as blocks.

The driving information acquisition unit 1 may include at least one of a driver state information acquisition unit 11, a vehicle surrounding information acquisition unit 12 and a vehicle information acquisition unit 13. The driver state information acquisition unit 11 detects the state of a driver. The vehicle surrounding information acquisition unit 12 acquires information of the environment surrounding a vehicle. The vehicle information acquisition unit 13 detects, as vehicle information, the amount of operations by the driver and vehicle behavior. The driver state information acquisition unit 11 provides the acquired driving information to the vehicle location information acquisition unit 2, the statistical information generation unit 3 and the driving assistance unit 6.

The vehicle location information acquisition unit 2 acquires vehicle location information. The vehicle location information acquisition unit 2 includes a GPS antenna, a GPS operation device, and the like. The vehicle location information acquisition unit 2 may calculate the vehicle location information based on the vehicle behavior as the driving information acquired from the driving information acquisition unit 1. The vehicle location information acquisition unit 2 provides the acquired vehicle location information to the driving assistance unit 6, the map information generation unit 4 and the map information reference unit 5.

The statistical information generation unit 3 generates statistical information by statistically processing the driving information provided by the driving information acquisition unit 1 as a time-series pattern.

The map information generation unit 4 generates map information by associating the vehicle location information when acquiring the driving information obtained from the vehicle location information acquisition unit 2 with the statistical information generated by the statistical information generation unit 3. More specifically, the map information generation unit 4 generates the map information from the statistical information generated by the statistical information generation unit 3 based on the location information.

The map information storage unit 7 stores road map data as a database. The map information storage unit 7 includes a map information update unit 71 capable of writing the map information sent from the map information generation unit 4. The map information update unit 71 updates the existing map information to the map information generated by the map information generation unit 4.

The map information reference unit 5 references and reads the map information stored in the map information storage unit 7, based on the location information acquired by the vehicle location information acquisition unit 2. Thus, the map information reference unit 5 extracts statistical information regarding driving stored at the current vehicle location from the data stored in the map information storage unit 7.

The driving assistance unit 6 performs driving assistance based on the statistical information (map information) obtained by the map information reference unit 5. Alternatively, the driving assistance unit 6 may perform the driving assistance based on real-time driving information obtained by the driving information acquisition unit 1 besides the map information. The driving assistance includes providing the driver with useful information for driving. The driving assistance unit 6 may also control the vehicle based on the statistical information and the driving information.

Next, description is given of details of information acquisition processing by the driving information acquisition unit 1 and the vehicle location information acquisition unit 2 in the driving assistance system described above.

The vehicle location information acquisition unit 2 uses an in-vehicle navigation system or signals from a GPS (Global Positioning System) installed in a mobile phone or the like carried by the driver. The vehicle location information acquisition unit 2 may acquire location information by using map information held by the in-vehicle navigation system or the like, other than acquiring latitude, longitude, altitude and the like with the GPS. As a map for a publicly known navigation system, there has been known a map having numbers of sections divided into a mesh pattern with regular intervals on a map, link numbers when roads are expressed as links, node numbers when intersections and separation and junction points are expressed as nodes which are contact points between the links, and the like, as map information. The vehicle location information acquisition unit 2 may match the map information with the vehicle location after detecting the latitude and longitude of the vehicle location with the in-vehicle GPS, and then add the mesh numbers, link numbers and node numbers after the matching to the latitude and longitude as the location information.

The driver state information acquisition unit 11 detects face movement as the state of the driver. The driver state information acquisition unit 11 acquires an image including the head of the driver by using an imaging device installed in front of a driver's seat, for example, and inputs the image information to a face movement detection device. As the face movement detection device, a heretofore known recognition technique may be employed. A technology disclosed in Japanese Patent Application Publication No. 2005-196567, for example, is applicable. The driver state information acquisition unit 11 uses the face movement detection device to acquire the posture angle of the head. Also, the driver state information acquisition unit 11 may detect the driver's visual line, blinks, mouth movement, facial expressions, hand movement touching his/her face and head, and the like based on taken images, other than the posture angle of the head, and use such information detected as the driver state information. Moreover, the driver state information acquisition unit 11 may also use body pressure distribution values of seating surface, back surface, side support and the like of the seat, as the body movement of the driver. Furthermore, as vital signals of the driver, the driver state information acquisition unit 11 may use the blood pressure, breathing, heart rate, sweating, muscle potential and the like, or may use the amount of brain activity simply measured by cerebral blood flows and the like. The driver state information acquisition unit 11 may combine biological information with a number of measured values of the visual line, facial expressions, body temperature and the like, and use a heretofore known calculation technique to calculate and acquire drowsiness, frustration, awareness, stress level, and a degree of relaxed state as information indicating the state of the driver.

The vehicle surrounding information acquisition unit 12 acquires observed values of a distance between the vehicle and an object around the vehicle, the object shape, and the like, as the information of the environment surrounding the vehicle. To acquire such values, the vehicle surrounding information acquisition unit 12 uses a ranging sensor such as a laser sensor, a millimeter-wave radar and a ultrasonic sensor, which are sensors for a lane keep system, an inter-vehicle distance control system and the like, for example. The vehicle location information acquisition unit 12 may also use videos and still images taken by an imaging device such as a video camera to detect a target to which the driver pays attention when driving the vehicle, such as positions of white lines, stop lines, crosswalks, arrows indicating courses and the like, which are drawn on a road surface, lateral locations of the own vehicle within a lane, the curvature of a lane ahead, traffic lights, traffic signs, pedestrians, bicycles and vehicles running around the own vehicle, and may acquire the detected values, shape and color of the detection target, a relative distance (location) between the target and the own vehicle, and the like as the information of the environment surrounding the vehicle. Moreover, as described later, the vehicle location information acquisition unit 12 may acquire time-series data of the atmosphere of a place related to driving, such as in the middle of a jammed traffic or a crowd, a quiet road, and a narrow residential road, based on sensor values and images as the information of the environment surrounding the vehicle.

The vehicle information acquisition unit 13 acquires information on the amount of operations by the driver and vehicle behavior. The vehicle information acquisition unit 13 acquires a steering angle, an accelerator position, an amount of brake operation, a turn signal switch signal, a wiper switch signal, a vehicle speed, forward and backward acceleration, upward and downward acceleration, leftward and rightward acceleration, a yaw rate, a roll rate, a pitching rate, and the like, for example. The vehicle information acquisition unit 13 may acquire a signal directly from a sensor or an operation device, or may acquire a signal flowing through an in-vehicle network such as a vehicle CAN. As to the detection of the vehicle behavior, the most intuitive way to detect a vehicle body yaw rate, for example, is to detect the yaw rate using a yaw rate sensor provided on a vehicle body. However, other than directly detecting the vehicle yaw rate, the steering angle and the vehicle speed, for example, may be detected to estimate the vehicle yaw rate based on the detection result. In the case of estimating the vehicle yaw rate, a steering angle sensor and a vehicle speed sensor are provided instead of the yaw rate sensor. As described above, the vehicle information acquisition unit 13 may acquire the vehicle information as values estimated by calculation without directly detecting the vehicle information.

Information obtained by a sensor device that is installed later by a user of the vehicle may be used as the information acquired by the driving information acquisition unit 1 and the vehicle location information acquisition unit 2 other than information obtained by a sensor device that is pre-installed in the vehicle, such as the information flowing through the vehicle CAN. A navigation system equipped with the existing GPS and gyro sensor, an in-vehicle video camera, a mobile device such as a mobile phone including an acceleration sensor and GPS, an existing drive recorder, or the like, for example, such as the sensor device to measure the vital signals of the driver described above in the driver state information acquisition unit 11, may be installed in the vehicle, and information outputted from sensors in such devices may be used.

The driving information acquired by the driving information acquisition unit 1 includes one-dimensional information such as the vehicle speed, steering angle and inter-vehicle distance. The driving information includes multidimensional time-series information besides the one-dimensional information. For example, the driving information includes information measured by "plane" such as a camera image and the millimeter-wave radar. The driving information also includes information measured by "line (point sequence)" with a scanning sensor such as a laser radar. The driving information further includes information measured by associating "multiple points". More specifically, a number of pieces of information are treated as a set, such as muscle potentials and ultrasonic sensors installed in four corners of the vehicle. Furthermore, the camera image and the like have a number of pieces of information with different meanings even within each of the pixels included in a screen, such as information on colors, brightness and density, texture information, and information on object shape characteristics such as a contour (edge).

The driving assistance system according to this embodiment is characterized by using the multiple pieces of one-dimensional time-series information and multidimensional time-series information described above as information acquired at the same time and place in the same traffic environment, and performing statistical processing in a state where relationships between such pieces of information are maintained.

Figure 2:
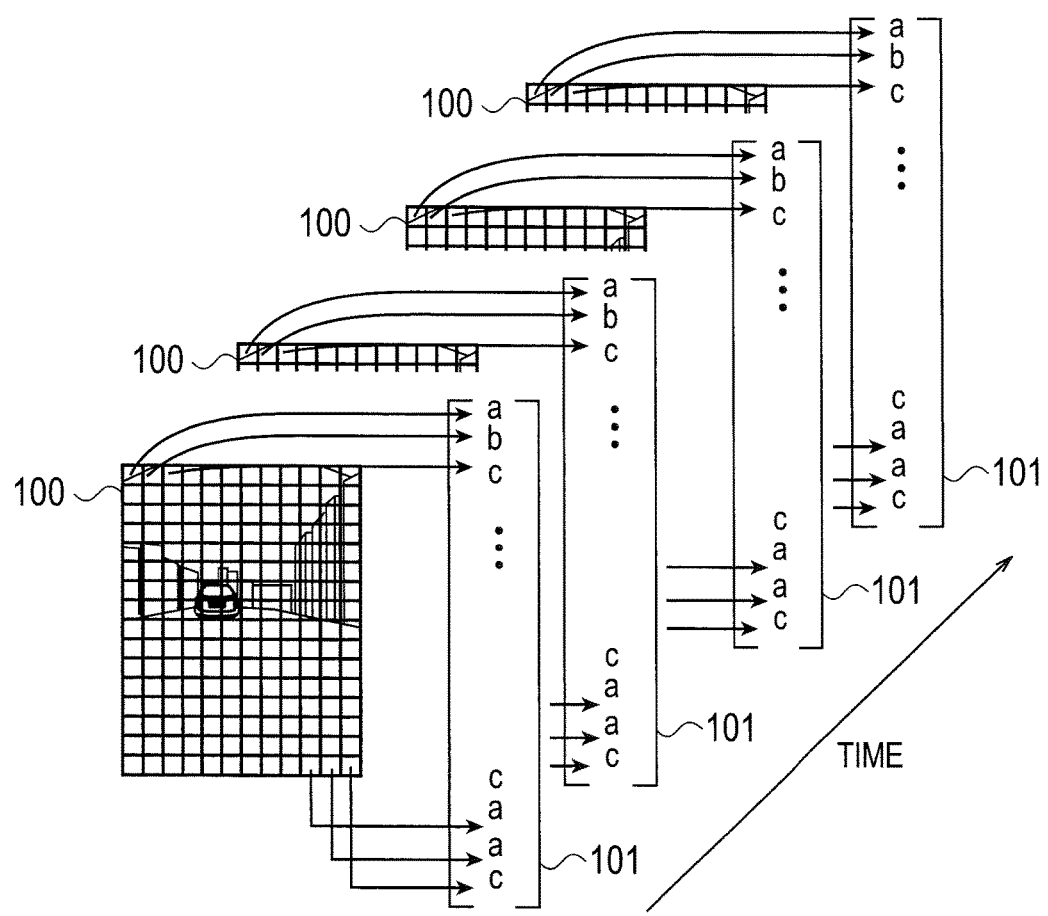
FIG. 2 is a diagram for explaining a color characteristic amount and a texture characteristic amount in the driving assistance system described as the first embodiment of the present invention.
Figure 3:
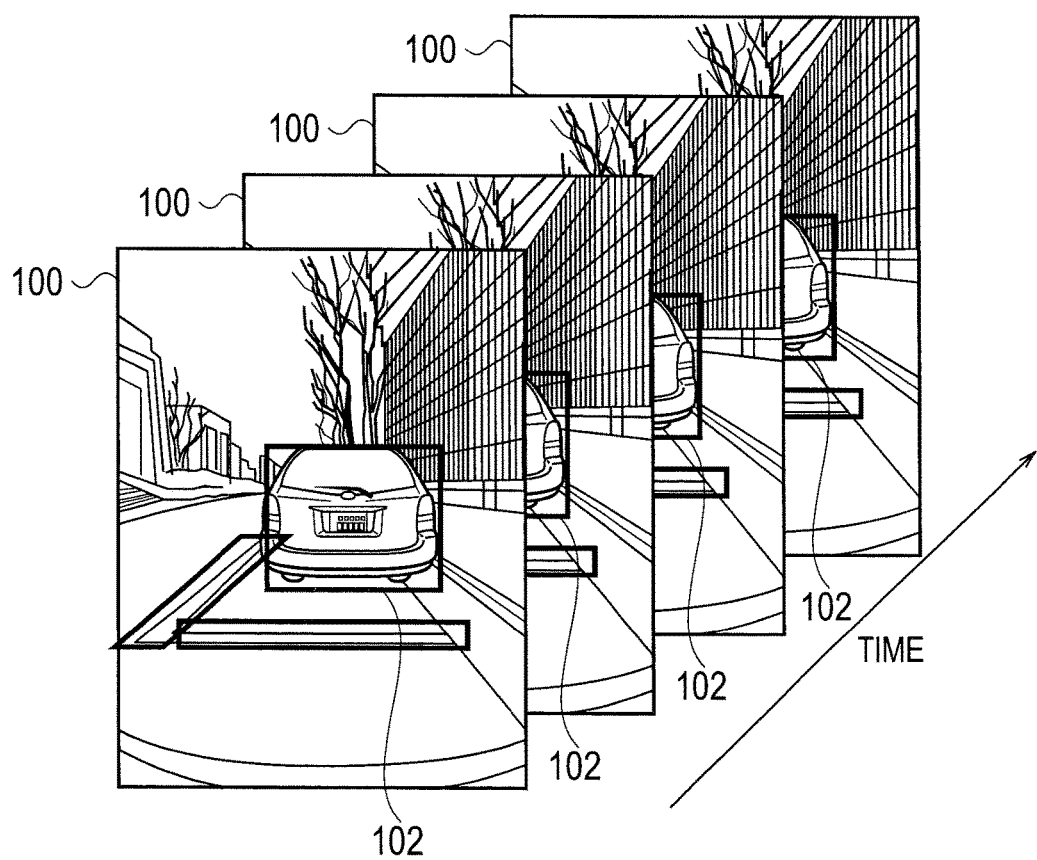
FIG. 3 is a diagram for explaining an object shape characteristic amount in the driving assistance system described as the first embodiment of the present invention.

FIGS. 2 and 3 are image diagrams of processing of cutting out images as still images and extracting a characteristic amount 101 from each of the still images to form a time-series pattern, when the information acquired by the driving information acquisition unit 1 is a camera image taken by shooting the outside of the vehicle by "plane". When extracting a color characteristic amount or a texture characteristic amount, the driving information acquisition unit 1 calculates the characteristic amount 101 for each of cells obtained by dividing the camera image 100 as shown in FIG. 2, and turns changes with time in the characteristic amount for each cell into time-series data along the time axis. As to the color characteristic amount, a heretofore known color space may be used, such as an RGB color space, a CIE-XYZ color space and a L*a*b* color space. Also, as the color characteristic amount, a color histogram, a color moment (average, variance, covariance, asymmetry and the like) that is a statistical amount of color distribution in the color space, and the like may be used for each cell.

Moreover, the driving information acquisition unit 1 can calculate a characteristic amount of the entire image. Furthermore, the driving information acquisition unit 1 may calculate a characteristic amount of each of regions obtained by dividing an image into cells, and use the texture characteristic amount by focusing on the region. As the texture characteristic amount, a heretofore known recognition technique may be employed, such as a structure characteristic describing a regular texture (an amount obtained by a morphological operation, a neighbor graph or the like) and a statistical characteristic describing a statistical distribution of image brightness (various multiresolution characteristic amounts or the like, such as Fourier power spectrum, density co-occurrence matrix, Markov random field, fractal model, Gabor transform and Wavelet transform). The driving information acquisition unit 1 calculates the color characteristic amount and texture characteristic amount of the entire image, and uses the calculated color characteristic amount and texture characteristic amount as the time-series data. Thus, changes with time in the traffic environment (atmosphere) at an information acquisition point, such as a state where the traffic environment is not occupied or crowded with people, bicycles or other vehicles, narrow streets and mountain roads where walls or obstacles are approaching, and a freeway with unvarying landscaping, can be statistically stored and used as the time-series data.

Furthermore, the driving information acquisition unit 1 may detect a characteristic amount 102 of an object shape as shown in FIG. 3. The driving information acquisition unit 1 detects a target to which the driver pays attention when driving the vehicle, such as lateral locations of the own vehicle within a driving lane, the curvature of a lane ahead, road marking such as stop lines and crosswalks, traffic lights and traffic signs, pedestrians, bicycles and other vehicles running around the own vehicle. The driving information acquisition unit 1 also detects a relative distance (positional relationship) between the detection target and the own vehicle, the shape and color of the detection target, and the like. The driving information acquisition unit 1 acquires the shape, color and the like of the target to which the driver pays attention when driving the vehicle, as the characteristic amount 102 of the object shape.

The driving information acquisition unit 1 may also use changes in the characteristic amount 102 of the object shape obtained through the process of detecting the target and the movement of the target (changes in location with time) as the time-series data. As methods for detecting a specific target and for detecting a shape characteristic amount, heretofore known recognition techniques may be employed. For example, a specific object and the shape characteristic amount may be detected using a region characteristic amount (Zernike moment, 2D Angular Radial Transformation (ART) and the like) and a contour characteristic amount (Fourier Descriptor, Curvature Scale Space, Edge Direction Histogram and the like) as a global shape characteristic amount, and using a characteristic amount such as (Color) SIFT, Spin Images and Video Google, a Bag-of-features approach or the like as a local characteristic amount.

Figure 4:
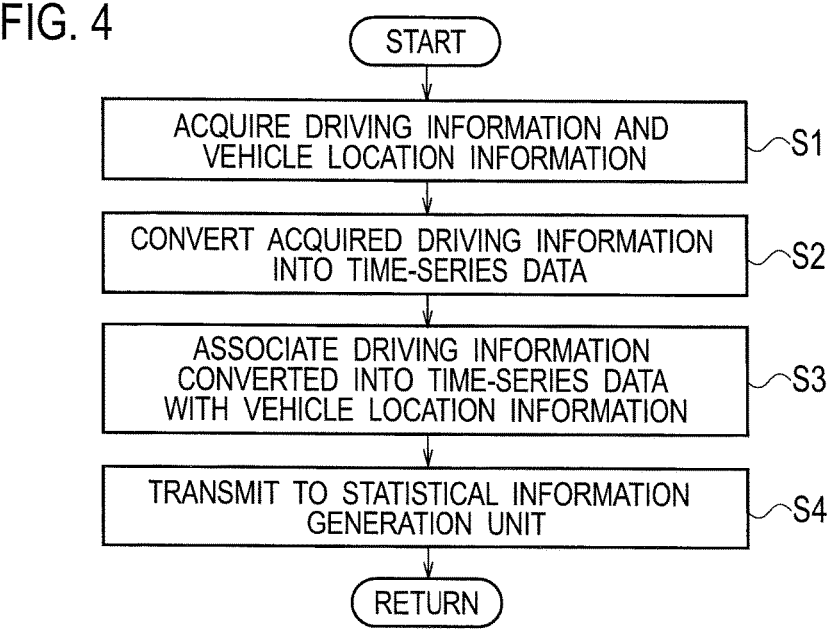
FIG. 4 is a flowchart showing time-series processing when driving information is a surrounding image in the driving assistance system described as the first embodiment of the present invention.

The driving information acquisition unit 1 converts the acquired driving information into time-series data through processing as shown in FIG. 4.

First, in Step S1, the driving information acquisition unit 1 and the vehicle location information acquisition unit 2 acquire driving information together with vehicle location information when the driving information is acquired.

Next, in Step S2, the driving information acquisition unit 1 converts the acquired driving information into time-series data. For information that does not need to be converted into time-series data at the time of acquisition thereof, such as a CAN signal, the processing may proceed to Step S3 by skipping Step S2. When the image described above and the like are the driving information, the driving information acquisition unit 1 calculates characteristic amounts and the like from the driving information, and converts changes in the calculated information with time into time-series data.

Thereafter, in Step S3, a time-series data set of the respective characteristic amounts obtained in Step S2 is associated with the vehicle location information.

Subsequently, in Step S4, the driving information acquisition unit 1 transmits the driving information as multidimensional time-series data associated with the vehicle location information in Step S3 to the statistical information generation unit 3.

When the vehicle surrounding information acquisition unit 12 uses a camera image taken by shooting the outside of the vehicle, in Step S1, the driving information acquisition unit 1 acquires an image of the surroundings of the vehicle together with the vehicle location information at the time of shooting.

Then, in Step S2, the driving information acquisition unit 1 extracts characteristic amounts from the acquired image. Since the image contains various kinds of information, images are cut out as still images at regular sample time intervals, for example, and the characteristic amounts are extracted by using the heretofore known image recognition technique described above. The driving information acquisition unit 1 converts changes with time in each of the extracted characteristic amounts into time-series data.

Thereafter, in Step S3, a time-series data set of the obtained characteristic amounts is associated with image shooting position information (vehicle location information).

Subsequently, in Step S4, the driving information acquisition unit 1 sends the set of the characteristic amounts associated with the image location information, as multidimensional time-series data, to the statistical information generation unit 3.

Here, although the description is given of the example where the driving information is the camera image taken by shooting the outside of the vehicle, the present invention is not limited thereto. As to other multidimensional time-series data, one piece of time-series data may be calculated from observation values in more than one dimension or characteristic amounts and the like may be extracted and changes therein with time may be used as time-series data, rather than converting observation values in each dimension into time-series data. For example, in the case of using a laser radar of a scanning ranging sensor used in the inter-vehicle distance control system or the like, relative position data of other vehicles calculated using a heretofore known recognition technique from laser radar observation values may be used as the time-series data, in addition to distance data for each scanning angle for observation.

Next, description is given of statistical state generation processing by the statistical information generation unit 3 and map information update processing by the map information generation unit 4 and the map information update unit 71.

Figure 5:
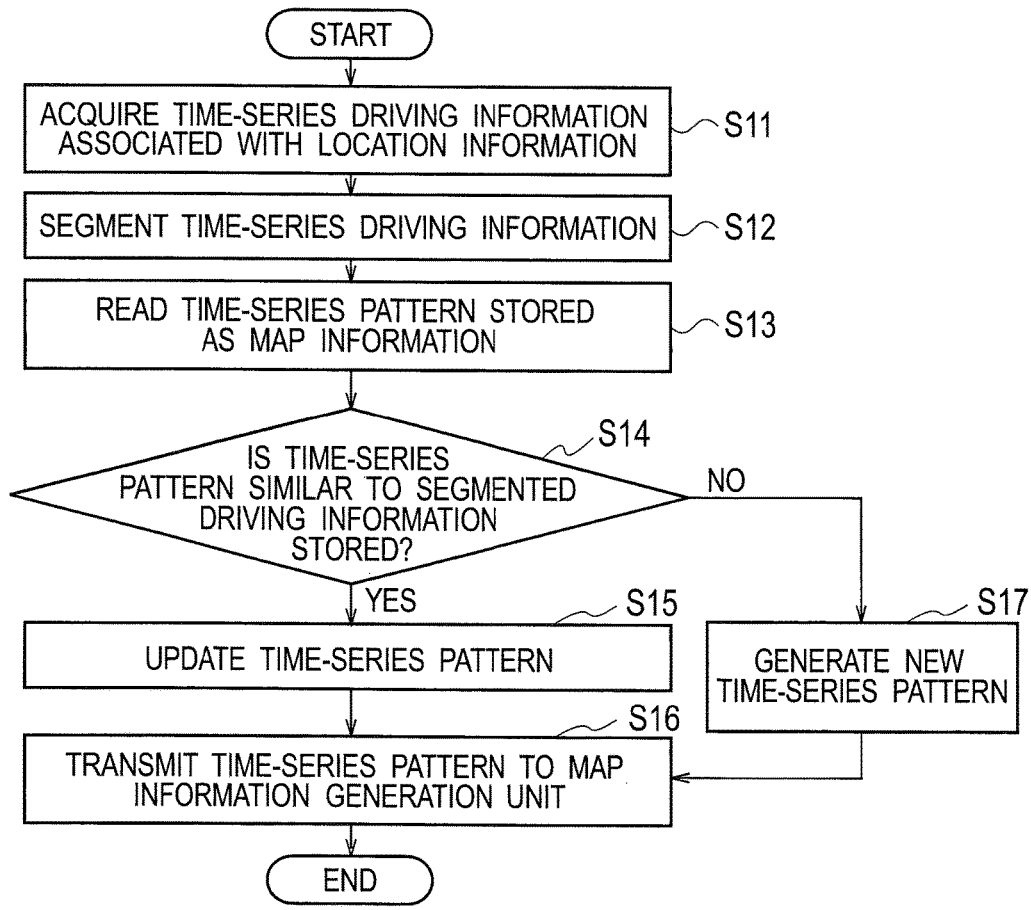
FIG. 5 is a flowchart showing processing of generating statistical information and updating map information in the driving assistance system described as the first embodiment of the present invention.

The statistical information generation processing and the map information update processing can be realized by processing as shown in FIG. 5, for example.

First, in Step S11, the statistical information generation unit 3 acquires the driving information processed to the time-series date by the driving information acquisition unit 1 and associated with the vehicle location information.

Next, in Step S12, the statistical information generation unit 3 segments the time-series data of the driving information acquired in Step S11 in such a manner that a point with large change serves as the boundary of a time-series pattern.

Then, in Step S13, the statistical information generation unit 3 reads a time-series pattern of the driving information already stored as map information from the map information storage unit 7 as the database.

Thereafter, in Step S14, the statistical information generation unit 3 determines whether or not a time-series pattern having likelihood very similar to that of the time-series pattern of the driving information segmented in Step S13 is already stored in the map information storage unit 7. When a similar time-series pattern is already stored in the map information storage unit 7, the driving information is provided to the map information generation unit 4, and the processing proceeds to Step S15. On the other hand, when there is no time-series pattern having a likelihood very similar to that of the time-series pattern of the segmented driving information, the processing proceeds to Step S17.

In Step S15, the statistical information generation unit 3 and the map information update unit 71 update the time-series pattern stored in the map information storage unit 7 by statistically processing newly acquired driving information.

Meanwhile, in Step S17, the statistical information generation unit 3 performs statistical processing based on the time-series patterns of the newly acquired driving information and another stored driving information. Thus, the statistical information generation unit 3 generates a new time-series pattern of the driving information.

In Step S16, the statistical information generation unit 3 transmits the updated or newly generated time-series pattern of the driving information, as the statistical information, to the map information generation unit 4.

Figure 6:
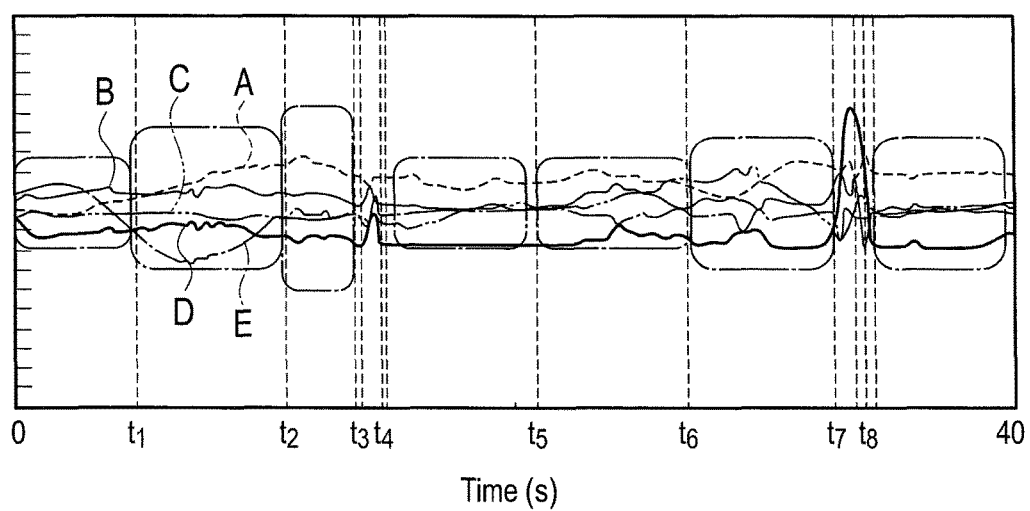
FIG. 6 is a diagram for explaining segmentation of time-series driving information in the driving assistance system described as the first embodiment of the present invention.

FIG. 6 is an image diagram showing segmentation of time-series data of multidimensional driving information. The statistical information generation unit 3 collectively processes the data A, B, C, D and E in a state of maintaining the relationships therebetween regardless of the number of dimensions of the acquired time-series data, and segments the time-series data in such a manner that a point with large change serves as the boundary of the time-series pattern. In the example shown in FIG. 6, the time-series data A, B, C, D and E of the driving information are divided and segmented into sections between t1 and t2, t2 and t3, t4 and t5, t6 and t7, and t8 and one subsequent thereto.

Figure 7:
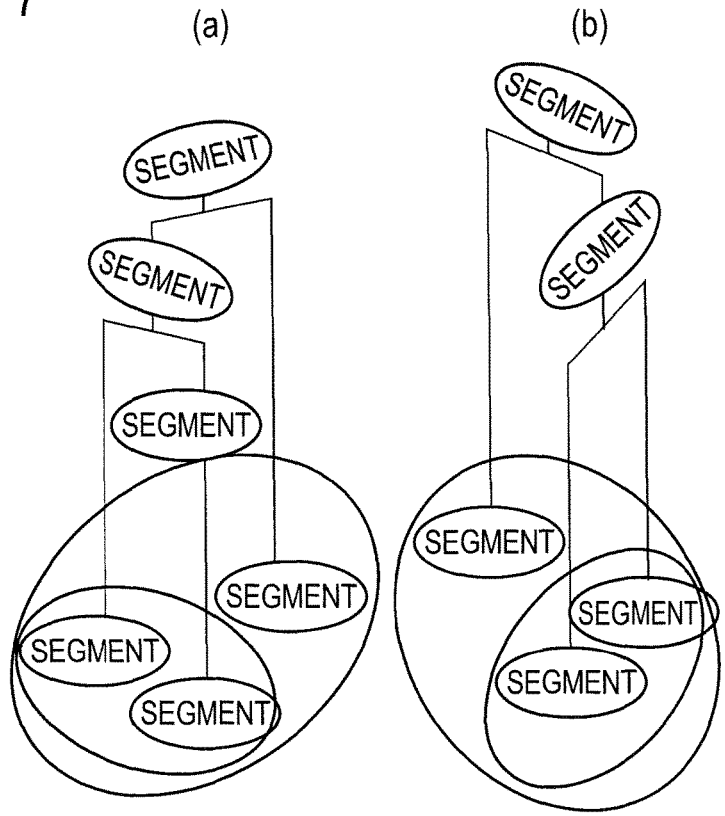
FIGS. 7 (a) and 7 (b) are diagram for explaining hierarchical classification of segmented driving information in the driving assistance system described as the first embodiment of the present invention.

FIG. 7 is an image diagram of a tree structure when segmented time-series driving information (segments) are classified into classes by using a hierarchical clustering method, as an example of a method for calculating a time-series pattern from driving information. The time-series pattern may be obtained as a statistical time-series pattern of each class by statistically processing each of the segmented time-series driving information for each class, as shown in FIGS. 7 (a) and 7 (b). Moreover, one typical piece of segmented time-series driving information may be selected from the classes, and used as the time-series pattern.

The inventors have found a method for extracting a pattern that forms continuous multidimensional time-series observation data from the data, a method for recognizing (coding or abstracting) time-series observation data by using a pattern, and a method for generating (estimating) time-series data from a pattern, and devised U.S. Pat. No. 4,027,838, for example, as one means for controlling a system by using such recognition and generation methods.

The statistical information generation unit 3 and the map information generation unit 4 according to this embodiment may employ the method as a method for extracting and recognizing a pattern. As a method for extracting a pattern from segmented time-series data, a probability statistics model called a hidden Markov model (HMM) is used. Besides the above, a method using a neural network and a genetic algorithm or a method using a linear discriminant function for discrimination using a threshold and a characteristic plane may be used in this embodiment. Also, heretofore known pattern identification method and data set clustering method may be used. Supervised and unsupervised machine learning or a heretofore known hierarchical clustering method such as a group average method and a Ward method may be used.

Figure 8:
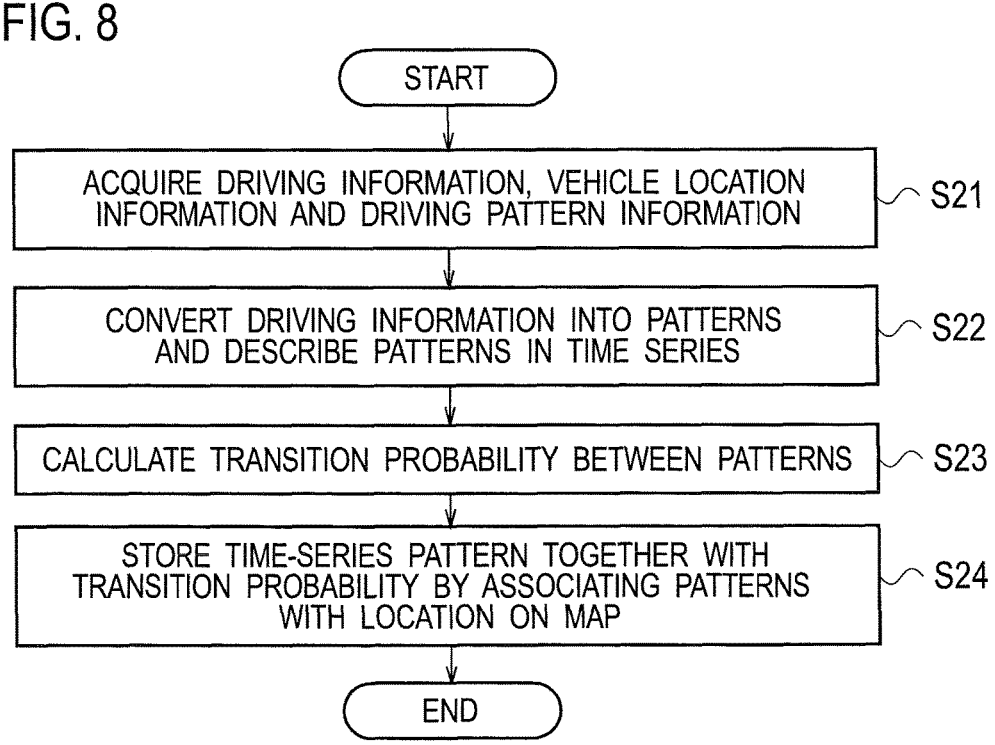
FIG. 8 is a flowchart showing processing of generating and storing map information in the driving assistance system described as the first embodiment of the present invention.

Next, with reference to a flowchart shown in FIG. 8, description is given of contents of processing performed by the map information generation unit 4 and the map information storage unit 7.

In Step S21, the map information generation unit 4 acquires the driving information acquired by the driving information acquisition unit 1, location information of the vehicle for which the driving information is acquired, and a time-series pattern (driving pattern information).

In Step S22, the map information generation unit 4 converts the driving information acquired in Step S21 into a time-series pattern, and describes the driving information in time series.

In Step S23, the map information generation unit 4 calculates a probability of transition from a temporally preceding driving information pattern to a temporally following driving information pattern in a string of driving information described in time axis in Step S22.

In Step S24, the map information generation unit 4 generates map information by associating the time-series pattern of the driving information, together with the transition probability obtained in Step S23, with locations on a map space, and stores the map information in the map information storage unit 7.

The map information is stored by associating the time-series pattern of the statistically processed driving information with the location information. Thus, the vehicle location information obtained by the vehicle location information acquisition unit 2 and the time-series pattern of the driving information as the statistical information obtained by the map information reference unit 5 are both combined. Accordingly, it can be known, as a statistical time-series pattern, how the vehicle behavior, driving operation, driver's state, traffic environment and the like change with time in a specific block or point on a map space.

Moreover, the time-series pattern of the statistically processed driving information is treated as the map information. Thus, all the data acquired by the driving information acquisition unit 1 does not need to be directly recorded. As a result, the recording data capacity of the map information storage unit 7 can be saved, and information can be efficiently stored.

Furthermore, temporal and spatial transition from one time-series pattern to another is obtained as the transition probability, and is associated with the time-series pattern and stored as the map information. This makes it possible to determine the time-series pattern of the driving information with a high probability of transition, based on the observed driving information and location information.

Figure 9:
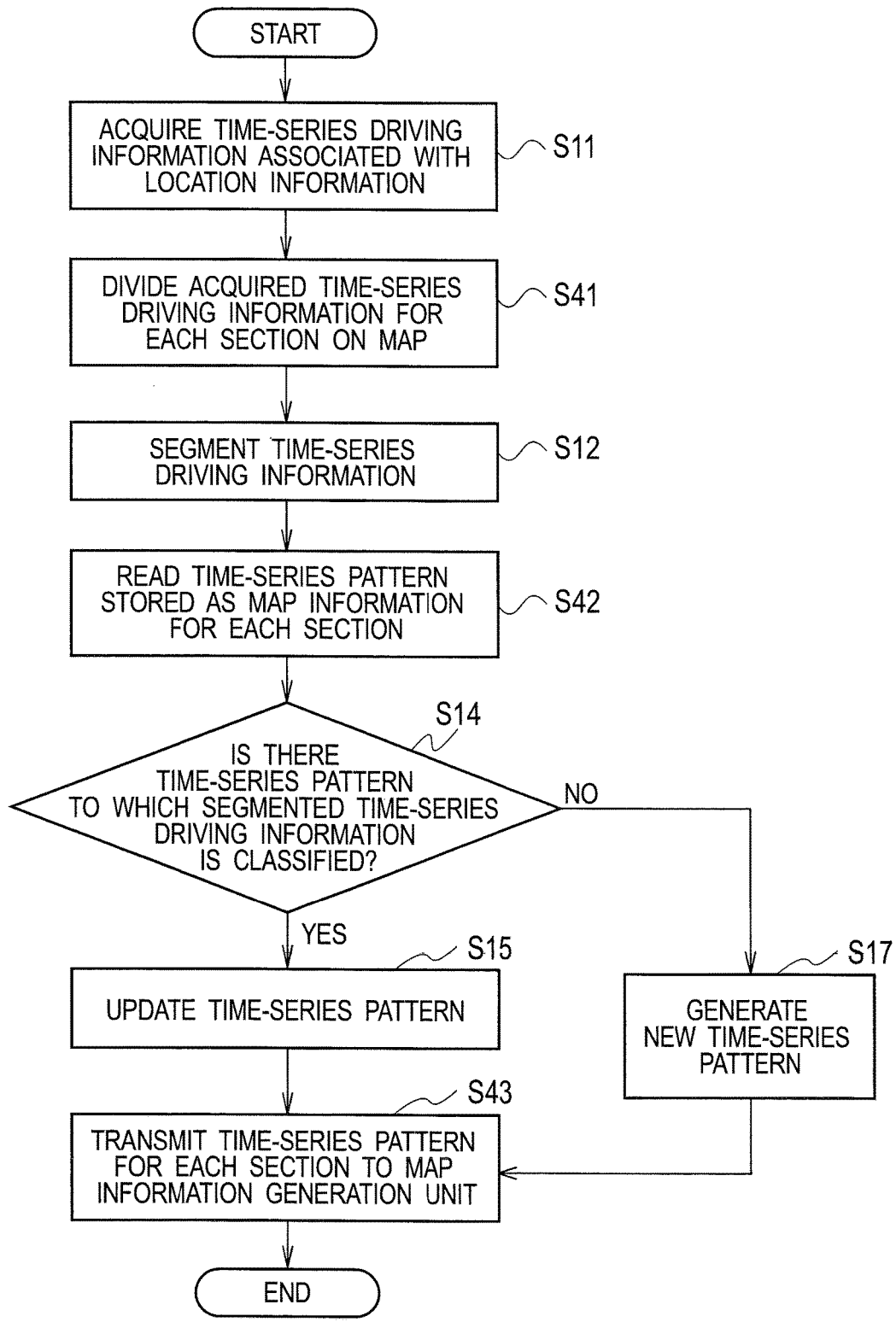
FIG. 9 is a flowchart showing processing of generating statistical information for each section in the driving assistance system described as the first embodiment of the present invention.

FIG. 9 is a flowchart showing contents of statistical information generation processing performed for each section by the statistical information generation unit 3 and the map information update unit 71.

Here, in FIG. 5, the driving information processed to the time-series date and associated as the location information is acquired in Step S11, the acquired time-series driving information is segmented in Step S12, and the driving information is converted into the time-series pattern in Steps S13 to S17. In the conversion to the time-series pattern, the time-series pattern is extracted based on all the segmented driving information, regardless of where the driving information is acquired. Thereafter, as described with reference to FIG. 8, the map information generation unit 4 generates the map information by associating the time-series driving information, together with the transition probability, with the location on the map space. By collectively calculating the time-series patterns regardless of the section where the information is acquired on the map, the number of time-series pattern can be suppressed and controlled. Thus, the operation amount and data capacity can be saved.

Meanwhile, in the processing shown in FIG. 9, the time-series driving information acquired in Step S11 is divided for each section on the map in Step S41 by the statistical information generation unit 3. The sections may be divided by a certain distance on a road. Alternatively, the sections may be divided along a lane shape such as a road section and a road type. Furthermore, the sections may be divided by a link or mesh in a navigation map, or may be divided by latitude and longitude or area within a certain range.

The statistical information generation unit 3 proceeds to Step S42 after segmenting in Step S12 the driving information divided for each section. In Steps S42 to S43, the map information generation unit 4 performs processing of reading, updating and newly generating a time-series pattern for each section, rather than performing such processing for all time-series patterns in the world.

In Step S43, the statistical information generation unit 3 transmits the time-series pattern for each section, which is calculated for each section and already associated on the map space, to the map information generation unit 4.

As described above, the driving information is divided for each section on the map acquired, and the time-series pattern of the driving information is calculated for each section based on the divided driving information. Thus, the time-series pattern of the driving information specific to the section can be extracted.

Note that the timing of calculating and updating the time-series pattern by statistically processing the driving information may be sequential update as the driving information is collection, update at a constant frequency, update when a certain amount of recorded driving information is stored, or any timing set by the driver. Moreover, as to the driving information to be used for calculation and update of the time-series pattern, all the driving information from the start of recording to the latest information may be statistically processed, or driving information recorded for a certain period may be statistically processed.

Figure 10:
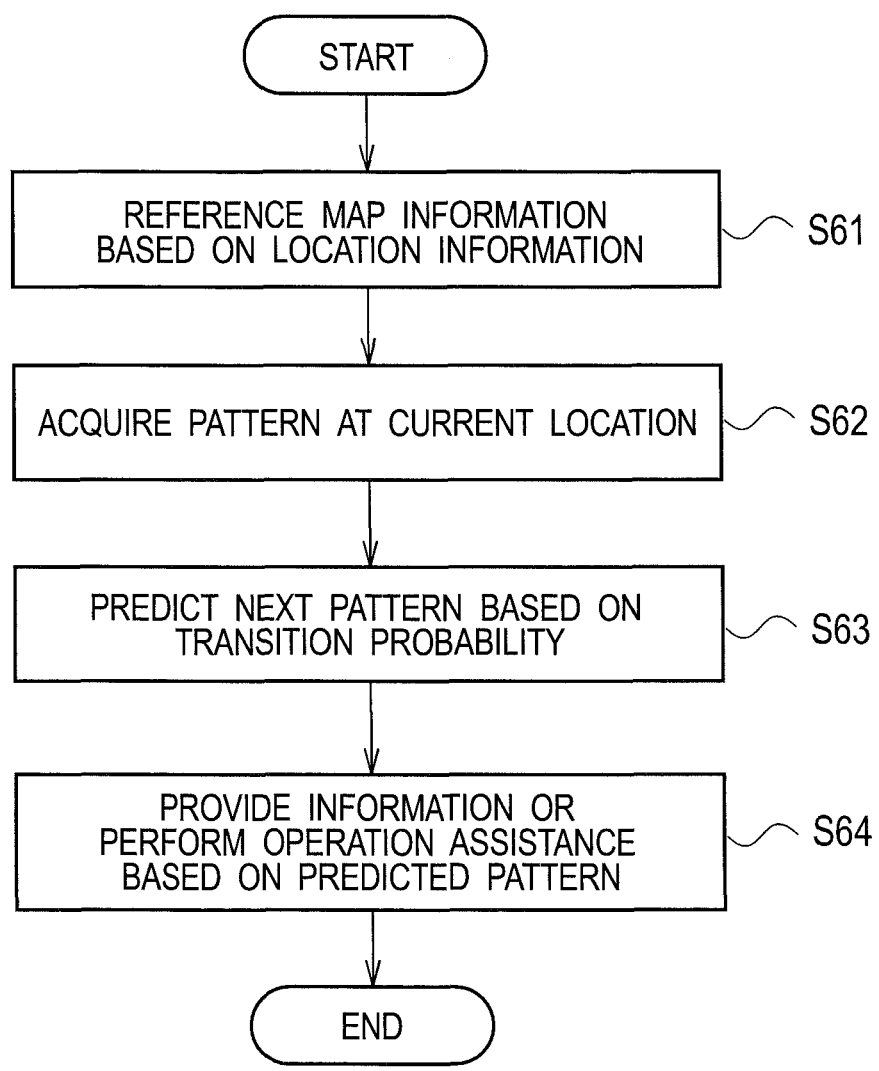
FIG. 10 is a flowchart including processing of predicting driving information in the driving assistance system described as the first embodiment of the present invention.

Furthermore, the driving assistance system described as the first embodiment may predict the next provision of information or driving operation by the map information reference unit 5 and the driving assistance unit 6 as shown in FIG. 10.

First, in Step S61, the map information reference unit 5 extracts statistical information about driving stored in the location of the vehicle from the data stored in the map information storage unit 7, based on the vehicle location information acquired by the vehicle location information acquisition unit 2.

Next, in Step S62, the map information reference unit 5 acquires a time-series pattern of the driving information at the current location.

Then, in Step S63, the map information reference unit 5 probabilistically predicts a following time-series pattern of the driving information from the time-series pattern of the driving information acquired in Step S62.

Thereafter, in Step S64, the map information reference unit 5 performs driving assistance, such as providing information to the driver and operation assistance, by using both of the following time-series pattern of the statistical driving information probabilistically predicted in Step S63 and the real-time information acquired by the driving information acquisition unit 1.

As described above, the driving assistance system can use the driving information observed in real time by the driving information acquisition unit 1 and the statistical information obtained by the map information reference unit 5 to describe the time-series pattern by replacing the current driving state with the time-series pattern. Moreover, a time-series pattern of driving information, which is likely to come next in time, can be determined based on the transition probability of the time-series pattern. Thus, driving information of a traffic environment to be encountered next by the vehicle can be probabilistically predicted as the time-series pattern.

Meanwhile, the vehicle location information observed in real time by the vehicle location information acquisition unit 2 and the statistical information acquired by the map information reference unit 5 are used. Thus, the time-series pattern of the driving information associated with the current location of the vehicle can be acquired. As a result, driving assistance can be performed while providing information on what kind of traffic environment the current location of the vehicle usually is.

Furthermore, driving assistance can be performed while also providing information on what kind of traffic environment the place or section next to the current location in space usually is. Moreover, a time-series pattern likely to come next in time can be determined based on the transition probability of the time-series pattern associated with the current location of the vehicle. This means that it becomes possible to probabilistically predict driving information about a traffic environment to be encountered next by a vehicle that usually passes the place.

The driving assistance unit 6 sets beforehand audio information, visual information and operation information corresponding to the time-series pattern of the driving information. To provide the driver with information, the driving assistance unit 6 includes an audio output device such as a speaker, a visual information display device such as a monitor, or a power assist device capable of controlling and outputting an operation amount and operation power of steering wheel, accelerator and brake. The driving assistance unit 6 may generate a driving operation amount for safety from the predicted time-series pattern described above, and present the operation amount to the driver by using driving assistance means. Moreover, the driving assistance unit 6 may present beforehand information that allows the driver to be ready for a complex traffic environment. Furthermore, the driving assistance unit 6 can perform driving assistance such as presenting information on route change for more comfortable driving and timing for route change or assisting the operation amount.

As described above, the driving assistance system described as the first embodiment generates map information by statistically processing driving information as a time-series pattern and associating the time-series pattern with the vehicle location information, and updates the existing map information. According to the driving assistance system, the time-series pattern of the statistically processed driving information is used as the map information by associating the time-series pattern with the location information. Thus, dynamic changes with time in the vehicle behavior, the driving operation, the state of the driver, the traffic environment and the like at the section and point on the map can be described and stored. Therefore, according to the driving assistance system, information can be provided to the driver or driving assistance such as operation assistance can be performed regarding dynamic traffic environment that varies with time depending on movement of the own vehicle and other vehicles therearound.

The driving assistance system can acquire the time-series pattern associated with the current location of the vehicle by using the time-series patterns stored as the map information. Thus, the driving assistance system can provide information on what kind of traffic environment the location of the vehicle usually is.

For example, when a time-series pattern is obtained, in which tracks of the vehicle do not remain within lanes, it is clear that there are many vehicles crossing the lanes. Therefore, the driving assistance system can provide the driver with information such as "Attention to vehicles changing lanes". As a time-series pattern of the next section in space, if it is known that there are many vehicles crossing the lanes, information such as "Attention to vehicles changing lanes ahead" can be provided to the driver. When many patterns of face movement and looking away are obtained as the state of the driver, information such as "Keep your eyes on the road" and "Avoid rear-end collision" can be provided to the driver by combining with the time-series pattern of the vehicle information such as the vehicle speed. Furthermore, information such as "Keep distance" and "Take a rest from driving" can be provided by obtaining, as time-series patterns, the frustration level, stress level and degree of drowsiness of the driver based on the blood pressure, heart rate and facial expressions.

The driving assistance system can provide such information not only as the audio information or visual information on a display but also to guide and assist driving by the driver to the safer side by controlling a pedal operation amount and the like as the driving operation amount. Furthermore, the driving assistance system acquires time-series patterns from the vehicle information, such as stop or acceleration and deceleration when starting the vehicle from the stop state, a stop position at an intersection with a stop sign and how the vehicle starts from the stop position, a cruising speed relative to a speed limit, and a steering amount for road alignments. Thus, the driving assistance system can also use such time-series patterns to assist the driver with the driving operation amount and as control target values for an automatically-operated vehicle.

Moreover, according to the driving assistance system, the driving information is divided for each section on the map whose information is acquired, and the time-series pattern is calculated for each section based on the divided information. Thus, the driving assistance system can extract the time-series pattern of the driving information specific to the section.

Furthermore, according to the driving assistance system, the time-series pattern of the driving information is calculated regardless of the sections on the map, and it is determined to which one of the preset time-series patterns the calculated time-series pattern corresponds. Thus, the number of the time-series patterns can be reduced compared with the case where different driving information time-series patterns are calculated for every location. As a result, the operation amount and data capacity can be saved.

[Second Embodiment]

Next, description is given of a driving assistance system according to a second embodiment. Note that the same components as those in the first embodiment described above are denoted by the same reference numerals, and detailed description thereof is omitted.

Figure 11:
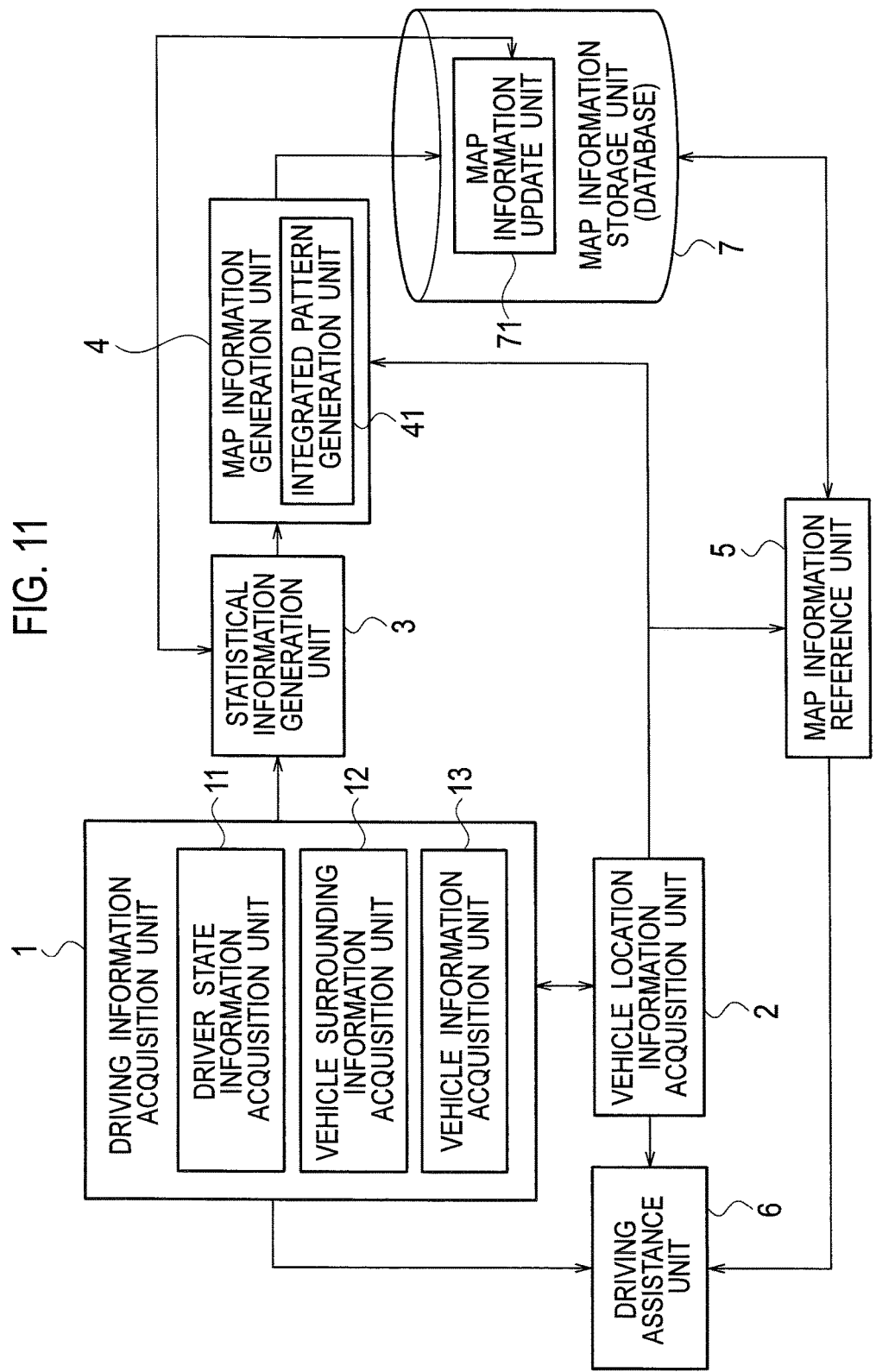
FIG. 11 is a block diagram showing a configuration with addition of integrated pattern generation unit in a driving assistance system described as a second embodiment of the present invention.

The driving assistance system described as the second embodiment has a configuration as shown in FIG. 11, for example. The driving assistance system is different from the driving assistance system described as the first embodiment in that an integrated pattern generation unit 41 is provided in the map information generation unit 4.

In the driving assistance system, the driving information acquisition unit 1 acquires more than one of the amount of operations by a driver and vehicle behavior, a state of the driver, and information of the environment surrounding the vehicle. The integrated pattern generation unit 41 associates time-series patterns with each other, which are calculated using the driving information acquired by the driving information acquisition unit 1, as the time-series patterns acquired in the same traffic environment.

Figure 12:
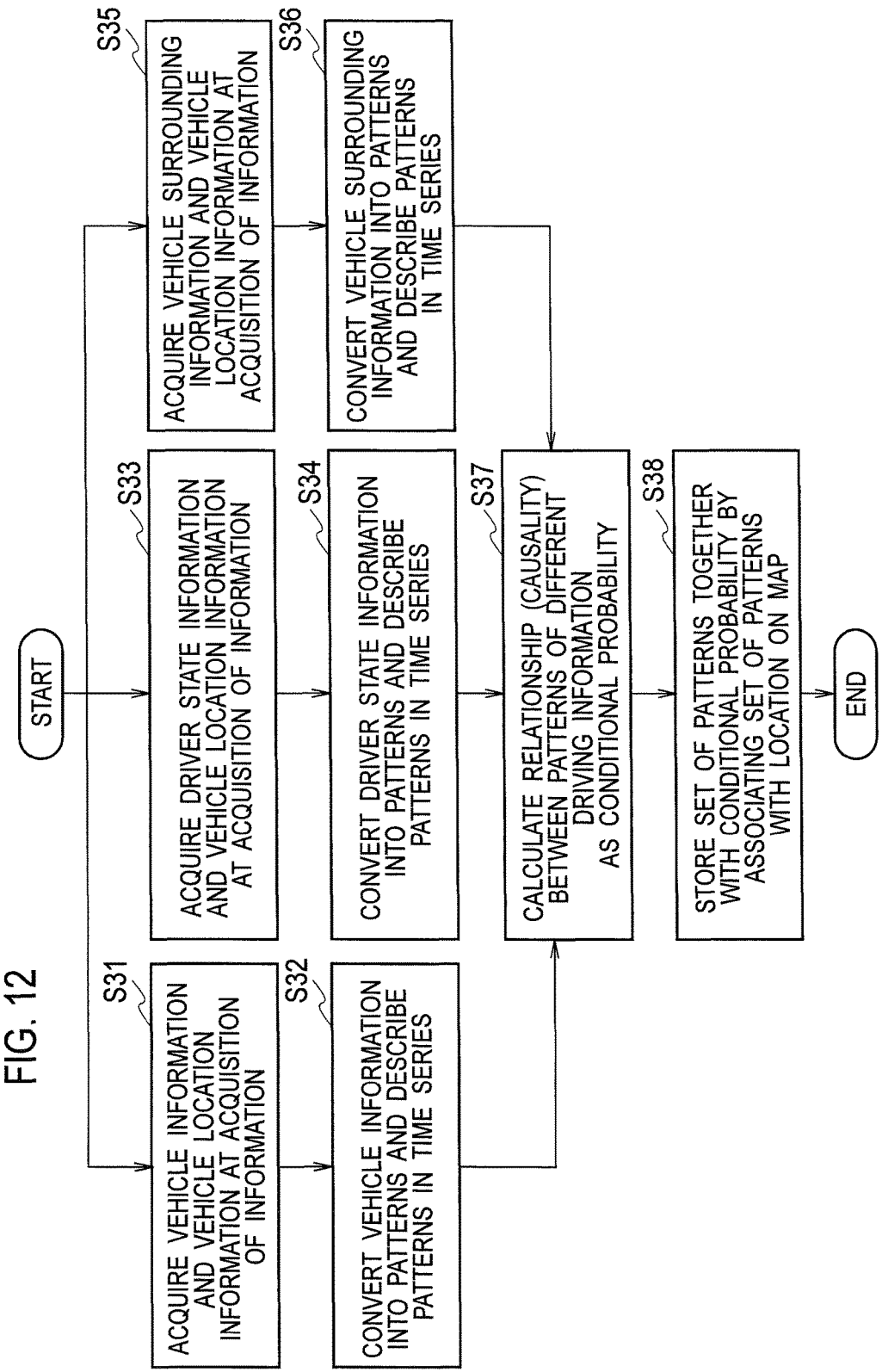
FIG. 12 is a flowchart showing processing of generating an integrated pattern in generation of map information in the driving assistance system described as the second embodiment of the present invention.

The integrated pattern generation unit 41 performs processing as shown in FIG. 12, for example. For example, description is given of processing by the integrated pattern generation unit 41 when the driving information acquisition unit 1 acquires vehicle information, driver state information and vehicle surrounding information.

In Steps S31, S33 and S35, the driving information acquisition unit 1 and the vehicle location information acquisition unit 2 acquire driving information including the vehicle information, the driver state information and the vehicle surrounding information at the same time together with location information.

In Steps S32, S34 and S36, the driving information acquisition unit 1 converts the vehicle information, the driver state information and the vehicle surrounding information into time-series patterns, respectively, and describes each piece of the information in time series of driving patterns.

Here, the vehicle information, the driver state information and the vehicle surrounding information are the driving information acquired in the same traffic environment at the same time and place. The respective pieces of information have relationships with each other in nature. The relationships between the information are not those expressed by a temporal transition probability in the same kind of information, but those (CAUSALITY and correlation) that exist between different kinds of driving information due to the acquisition in the same traffic environment at the same time and place.

Figure 13:
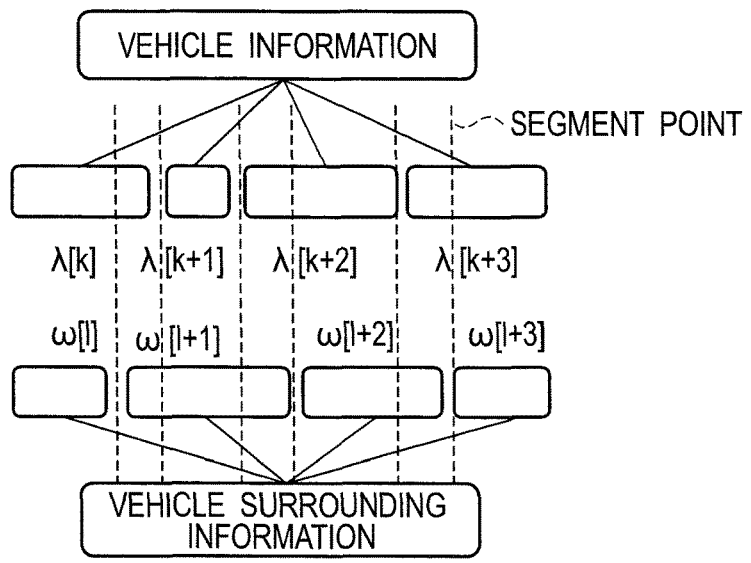
FIG. 13 is a diagram for explaining the processing of generating the integrated pattern in the driving assistance system described as the second embodiment of the present invention.

Next, in Step S37, the integrated pattern generation unit 41 can express the relationships (CAUSALITY and correlation) between different driving information patterns as shown in FIG. 13. FIG. 13 is an image diagram for explaining a processing flow performed by the integrated pattern generation unit 41. Note that FIG. 13 is described later. In this event, the integrated pattern generation unit 41 calculates the conditional probability at each segment point.

Then, in Step S38, the integrated pattern generation unit 41 stores a set of the time-series patterns of the respective driving information with the conditional probability calculated in Step S37 in the map information storage unit 7 while associating the set with the location on the map.

Here, description is given of a method for expressing, with a statistical model, the relationships (CAUSALITY and correlation) between the time-series patterns of the different driving information by taking as an example the case where the vehicle information and the vehicle surrounding information. As the driving information acquisition unit 1 converts the vehicle information and the vehicle surrounding information into time-series patterns and describes the information as time-series patterns, the positions of the segment points vary as shown in FIG. 13. The transition of the vehicle information and vehicle surrounding information at each segment point is described as the conditional probability to express the relationships between the time-series patterns of the different driving information.

The probability of transition from the state of a time-series pattern λi of the vehicle information and a time-series pattern ωj of the vehicle surrounding information to the state of a time-series pattern λk of the vehicle information and a time-series pattern ωl of the vehicle surrounding information at a certain segment point is expressed as P (λk, ωl|λi,ωj). This transition probability can be calculated by the following Equation 1.

[Equation 1]

$$P(\lambda_k, \omega_l | \lambda_i, \omega_j) = n(\lambda_i, \omega_j, \lambda_k, \omega_l) / n(\lambda_i, \omega_j)$$ (Equation 1)

Here, n(λi,ωj) is the number of appearances of the pair (λi,ωj) of the time-series patterns of the vehicle information and vehicle surrounding information. Also, n(λi,ωj,λk,ωl) represents the number of transitions from the pair (λi,ωj) of the time-series patterns to (λk,ωl).

The integrated pattern generation unit 41 can estimate the vehicle information and the vehicle surrounding information by obtaining (λk,ωl) that maximizes the probability P(λ$_k$, ω$_l$|λ$_i$,ω$_j$) from the state of the traffic environment of the pair (λi,ωj) of the time-series patterns. This resembles the state where a future traffic environment is predicted from the vehicle information and vehicle surrounding information sensed by the driver based on his/her experience. Therefore, the driving assistance system can present information that is easily perceived by the driver.

When the current vehicle information is λ[k] and the current vehicle surrounding information is ω[k], next vehicle information and vehicle surrounding information can be predicted by the following Equation 2.

[Equation 2]

$$(\hat{\lambda}[k+1], \hat{\omega}[k+1]) = \underset{(\lambda,\omega)}{\mathrm{argmax}} P(\lambda, \omega | \lambda[k], \omega[k])$$ (Equation 2)

As described above, according to the driving assistance system described as the second embodiment, the time-series patterns calculated using the driving information are associated with the time-series patterns acquired in the same traffic environment. Specifically, two or more time-series patterns based on the driving information collected in the same traffic environment are associated with each other and stored.

Thus, according to the driving assistance system, the information can be stored in a state of maintaining the relationships between the information such as the driving operation corresponding to the traffic environment, the traffic environment and the state of the driver. Also, the time-series patterns of the different kinds of driving information are associated with each other using the conditional probability. Thus, even when some of the driving information cannot be observed, a state that comes next in time can be predicted, associated driving information can be estimated, and driving information that is supposed to be generated at the same time in the same traffic environment but cannot be observed can be predicted, based on driving information that can be observed. As a result, driving assistance can be performed for the driver.

[Third Embodiment]

Next, description is given of a driving assistance system according to a third embodiment. Note that the same components as those in the embodiments described above are denoted by the same reference numerals, and detailed description thereof is omitted.

Figure 14:
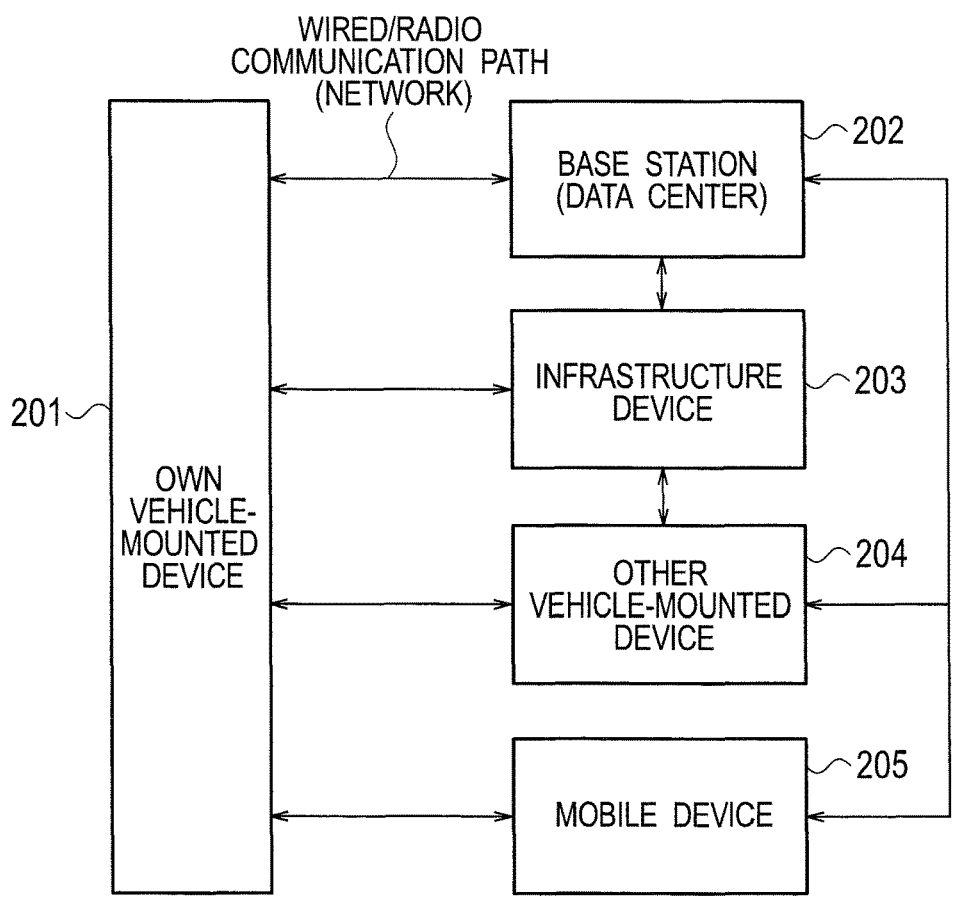
FIG. 14 is a block diagram showing targets that communicate with each other in a driving assistance system described as a third embodiment of the present invention.

The driving assistance system described as the third embodiment is realized by a network system as shown in FIG. 14, for example.

In the driving assistance system shown in FIG. 14, an own vehicle-mounted device 201 includes a communication function to transmit and receive information to and from various devices outside a vehicle. The communication function can communicate with a base station 202, an infrastructure device 203, an other vehicle-mounted device 204 and a mobile device 205. The communication function transmits and receives information via a telephone line or an Internet connection through packet communication of a mobile communication service or radio communication such as a wireless LAN, for example. Note that a configuration may be employed, in which the constituent components in the driving assistance system are unwired and the base station 202 is provided as a data center outside the vehicle, for example, to share arithmetic processing with the base station 202 without performing all the arithmetic processing only by the own vehicle-mounted device 201.

Figure 15:
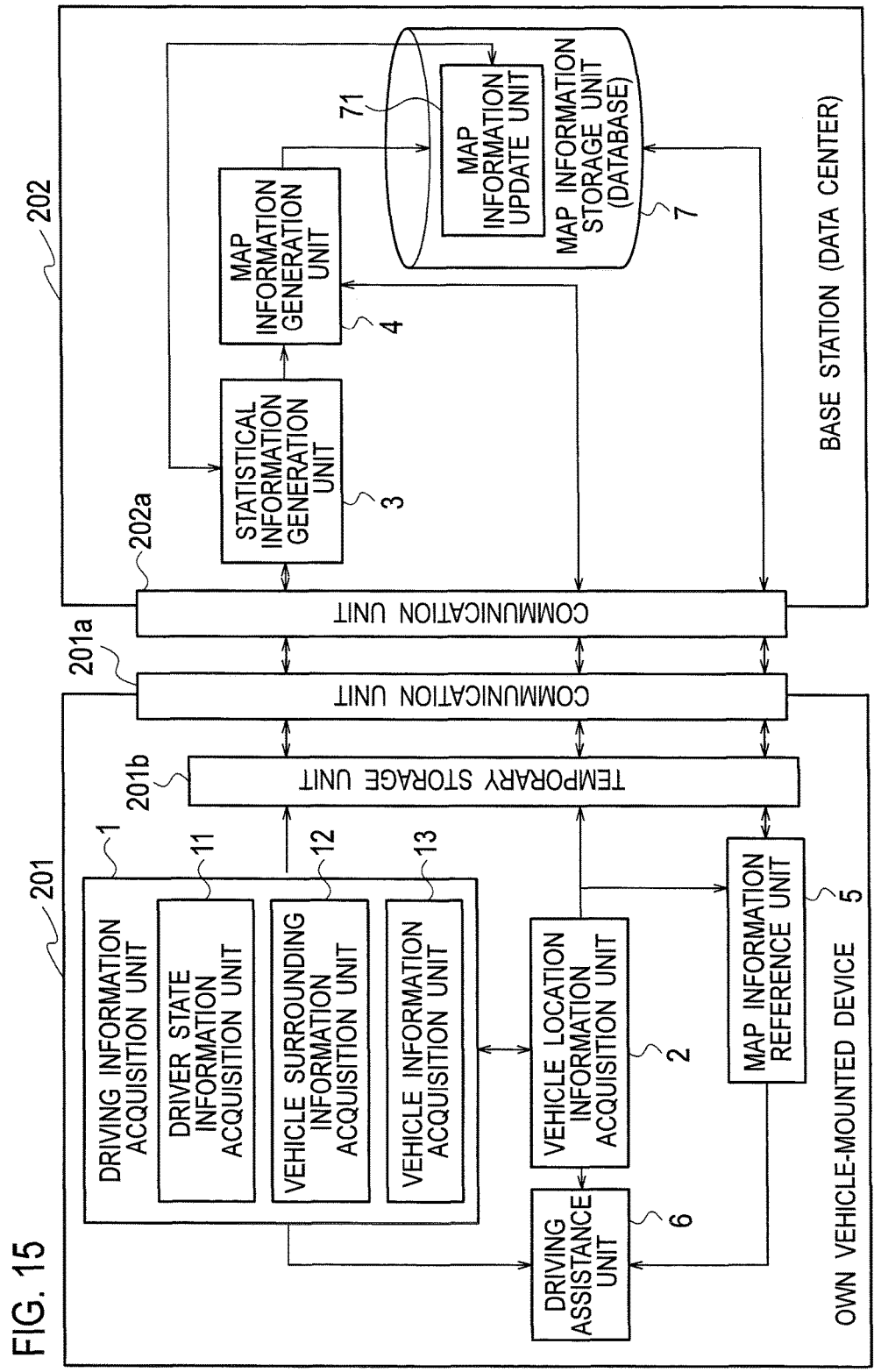
FIG. 15 is a block diagram showing a configuration including communication unit in an in-vehicle device in the driving assistance system described as the third embodiment of the present invention.

As shown in FIG. 15, the driving assistance system has a configuration in which the own vehicle-mounted device 201 is connected to the base station 202 through a communication line. The driving assistance system is different from the driving assistance system according to the first embodiment in that a communication unit 201a and a temporary storage unit 201b, which are included in the own vehicle-mounted device 201, and a communication unit 202a included in the base station 202 are provided.

In the driving assistance system, the own vehicle-mounted device 201 is connected to an operation device outside the vehicle, such as a data server, thereby eliminating the need to perform all the arithmetic processing using only the vehicle devices. Thus, the arithmetic processing can be shared in an optimal way in consideration of communication load and operation amount.

Note that the own vehicle-mounted device 201 and the communication unit 201a that transmits and receives information to and from the outside of the vehicle do not always have to be constantly communicatable. For example, the own vehicle-mounted device 201 and the communication unit 201a may communicate at regular intervals, only when the communication line is in a good state, during idling when the vehicle speed is zero, during charging of an electric vehicle, at the start or end of driving, or only when the driver allows communication. Furthermore, driving information to be recorded may be stored while the communication line is disconnected, and the information may be transmitted and received separately or collectively during communication.

Therefore, the communication unit 201a does not always have to perform packet communication of the mobile communication service or radio communication such as the wireless LAN, but may transmit and receive information through wired connection when the vehicle is parked.

Moreover, the own vehicle-mounted device 201 includes a detachable storage medium, and driving information is stored in the storage medium during driving. Then, the owner of the vehicle may manually upload the driving information and download map information by attaching and detaching the storage medium.

Moreover, the communication units 201a and 202a may utilize information distribution by a communication device set as the infrastructure device 203 such as a roadside device DSRC (spot communication: 5.8 GHz narrow band communication (Dedicated Short Range Communication)), VICS (registered trademark) (Vehicle Information and Communication System), FM multiplex broadcasting, digital broadcasting, radio beacon and optical beacon.

Moreover, the communication unit 201a may exchange information from an imaging device (traffic monitoring camera) and a sensor for traffic environment, which are installed on the road, and use such information as the information acquired by the driving information acquisition unit 1. For example, traffic information and the like observed at a fixed point, which cannot be collected by a moving vehicle, can be acquired from the sensor installed on the road.

Furthermore, the communication unit 201a may not only exchange information between the road and the vehicle but also perform inter-vehicle information communication with the other vehicle-mounted device 204. The communication unit 201a may also exchange information between a person and the vehicle with the mobile device 205 carried by a pedestrian or a person riding a bicycle. By acquiring driving data of a vehicle other than the own vehicle, the acquired driving information can be provided from a vehicle with many in-vehicle sensors to a vehicle with fewer sensors, or relative positional relationships and the like in the same environment can be included in the information.

Thus, the traffic environment can be described with more abundant information, and information about a place where the own vehicle has never driven or map information of a wider range than the driving range of the own vehicle can be created. Moreover, exchange of information between vehicles enables the driver to know driving patterns of others. As a result, the driver can alter his/her own driving behavior or improve the traffic environment by working on the other vehicles.

Furthermore, the communication unit 201a exchanges information between a person and the vehicle with the mobile device 205 carried by a pedestrian or a person riding a bicycle. Thus, the driver can use the presence or movement of a moving body other than vehicles as information, or exchange pattern information between the pedestrian or bicycle side and the vehicle side. Thus, the driver can predict the movement of the others and avoid an accident or a risk based on the prediction.

Note that FIG. 14 shows only two vehicles, one with the own vehicle-mounted device 201 and the other with the other vehicle-mounted device 204. However, in this embodiment, other vehicles not shown in FIG. 14 can also transmit or receive information to and from the base station (data center) 202 through a communication path, and the number thereof is not limited. Likewise, FIG. 14 shows only one infrastructure device 203 and one mobile device 205. However, other devices not shown in FIG. 14 transmit and receive information to and from devices and vehicles through a communication path, and the number thereof is not limited.

As described above, according to the driving assistance system described as the third embodiment, the communication unit 201a is provided, which exchanges information with the communication devices outside the vehicle, and the driving information acquisition unit 1 can use the information acquired by the communication unit 201a as the driving information. Thus, the driving assistance system can acquire driving data of other vehicles by using the own vehicle-mounted device 201, thereby enabling creation and use of map information of a wide range, such as a place where the vehicle has never driven.

Moreover, the driving assistance system can collect information from the imaging device and sensor for traffic environment, which are installed on the road. Furthermore, the driving assistance system allows the own vehicle-mounted device 201 to communicate with the operation device outside the vehicle such as a server environment, thereby eliminating the need to perform all the arithmetic processing with the own vehicle-mounted device 201. Thus, the processing can be shared in an optimal way in consideration of communication load and operation amount.

[Fourth Embodiment]

Next, description is given of a driving assistance system according to a fourth embodiment. Note that the same components as those in the embodiments described above are denoted by the same reference numerals, and detailed description thereof is omitted.

Figure 16:
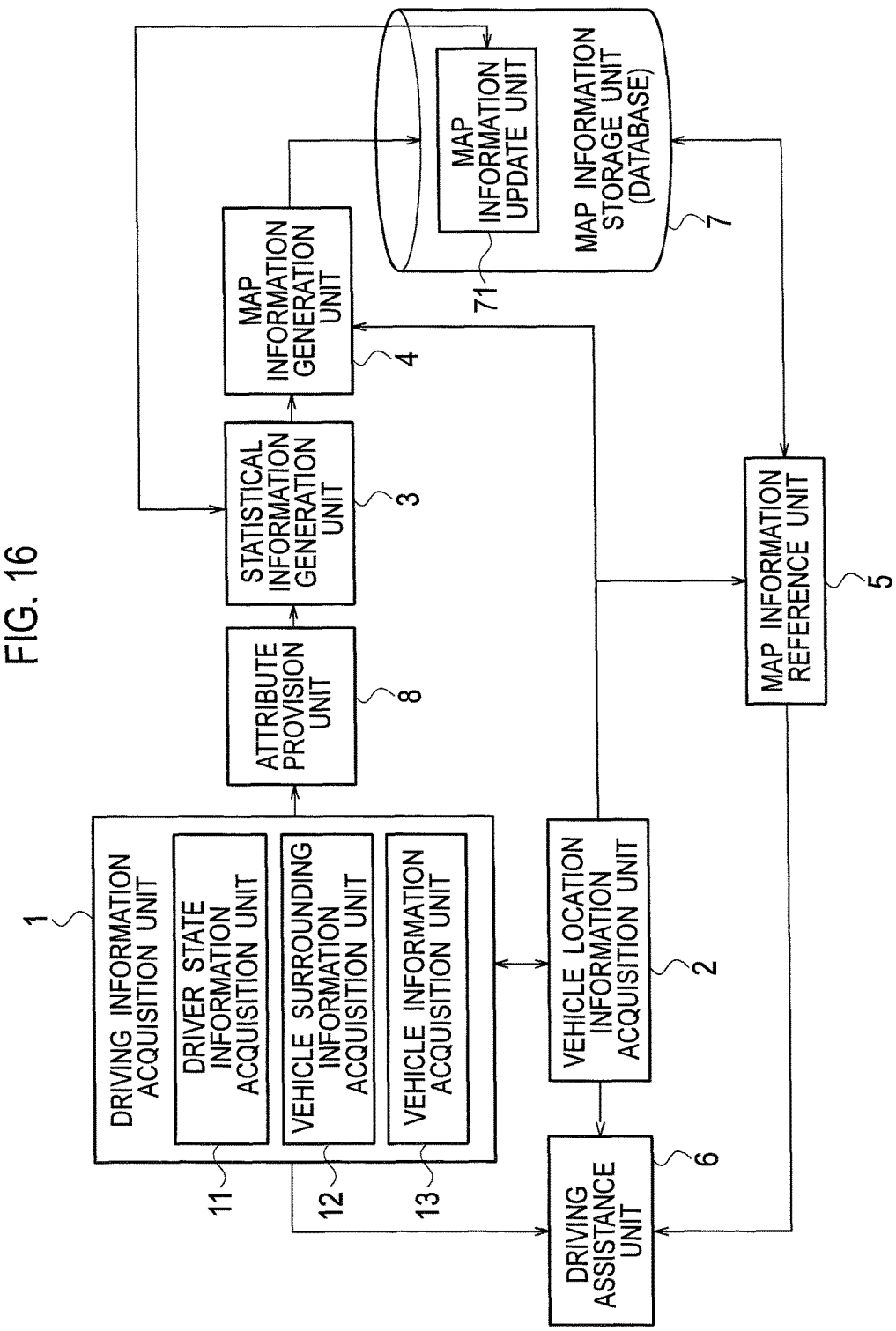
FIG. 16 is a block diagram with an additional configuration to provide attributes to driving information in a driving assistance system described as a fourth embodiment of the present invention.

The driving assistance system described as the fourth embodiment is different from the driving assistance systems according to the embodiments described above in including an attribute provision unit 8 as shown in FIG. 16, for example. The attribute provision unit 8 provides attributes to driving information acquired by the driving information acquisition unit 1. Then, the statistical information generation unit 3 statistically processes the driving information as time-series patterns for each of the attributes provided by the attribute provision unit 8.

The attributes provided by the attribute provision unit 8 are information for classifying situations when the driving information is acquired. The attributes include, for example, attributes regarding time (date, time, time zone, day, month, quarter, season, and the like), attributes regarding driving environments (traffic jam, crowd, cruise, stop-and-go, residential area, school zone, mountain area, and the like), attributes regarding the use purpose of the vehicle (commuting, work, leisure, long-distance travel, and the like), and attributes regarding passengers of the vehicle (alone, group, family, elder, novice driver, and the like). The attribute provision unit 8 may automatically provide the attributes to the driving information when the driving information is acquired, or may provide the attributes to the driving information according to a switch operation by the driver.

The driving assistance system performs processing shown in FIG. 17, for example, to statistically process the driving information having the attributes provided thereto.

The statistical information generation unit 3 in the driving assistance system classifies time-series driving information having attributes provided thereto, which is acquired in Step S11, for each of the attributes in Step S51. In Step S12, the statistical information generation unit 3 segments the driving information classified for each attribute.

Then, in Step S52, the statistical information generation unit 3 reads a time-series pattern stored as map information together with the attributes. In subsequent Steps S14, S15 and S17, the time-series pattern is updated or a new time-series pattern is generated, as in the case of the embodiments described above, regardless of the attributes.

Thereafter, in Step S53, new attribute information is provided, together with the attributes already provided before arithmetic processing, to the calculated time-series pattern, and is transmitted to the map information generation unit 4.

As described above, according to the driving assistance system described as the fourth embodiment, the attributes are provided to the driving information, and the statistical processing is performed using the driving information as the time-series pattern for each of the attributes. Thus, time-varying information is acquired for each attribute and provided for driving assistance. For example, even for the same place on a map, characteristics of the place where the situation of the traffic environment changes can be described in more detail for each time zone, season, day and weather as the attributes. Thus, the characteristics of the place can be described for each of the attributes included in the traffic environment.

Therefore, the time-series pattern of the driving information can be extracted for each level of driving skills of the driver or the like, for example. Thus, driving assistance can be performed, such as providing information corresponding to the driving skills and operation assistance. Moreover, information of traffic environment that varies with time of the day can be acquired, such as "traffic is heavy during morning hours from Monday through Friday". Such information can be provided to the driver. Thus, the driver can select a route to avoid the traffic beforehand even when the driver passes the place at different hours or passes the place for the first time.

Note that the embodiments described above are only examples of the present invention. Therefore, the present invention is not limited to the embodiments, and can be carried out, as a matter of course, by embodiments other than the above embodiments while various changes can be made according to the design or the like, without departing from the technical scope of the invention.

INDUSTRIAL APPLICABILITY

According to the present invention, a time-series pattern of statistically processed driving information and location information are associated with each other to be used as map information. Thus, dynamic changes in the driving information with time can be stored, and driving assistance can be performed for dynamic environment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 driving information acquisition unit
2 vehicle location information acquisition unit
3 statistical information generation unit
4 map information generation unit
5 map information reference unit
6 driving assistance unit
7 map information storage unit
8 attribute provision unit
11 driver state information acquisition unit
12 vehicle surrounding information acquisition unit
13 vehicle information acquisition unit
41 integrated pattern generation unit
71 map information update unit
201 own vehicle-mounted device
201a communication unit
201b temporary storage unit
202 base station
202a communication unit
203 infrastructure device
204 other vehicle-mounted device
205 mobile device

The invention claimed is:

1. A driving assistance system comprising:
a computer programmed to:
acquire operations by a driver, a vehicle behavior, a state of the driver, and information regarding an environment surrounding a vehicle as driving information from an in-vehicle network, an imaging device installed in front of a driver's seat and a ranging sensor;
acquire vehicle location information from an in-vehicle navigation system;
generate statistical information by statistically processing the driving information as a time-series pattern;
calculate a transition probability from a temporally preceding driving information pattern to a temporally following driving information pattern, and generate map information by associating the statistical information and the transition probability with the vehicle location information at the time of the acquisition of the driving information;
reference and read the map information based on the transition probability and the location information;
perform driving assistance based on the map information; and transceiver that transmits and receives information to and from a communication device outside the vehicle, wherein the information acquired by the transceiver is provided as the driving information for using the information acquired by the transceiver as the driving information and generating the statistical information, and wherein the computer generates a driving operation amount, that comprises at least one of a steering wheel amount, an accelerator amount, and a brake amount, from the statistical information and presents the driving operation amount to the driver.

2. The driving assistance system according to claim 1, wherein the computer is further programmed to:
  acquire more than one of the amount of operations by the driver, the vehicle behavior, the state of the driver, and the information regarding the environment surrounding the vehicle, and
  associate the time-series patterns calculated using the driving information acquired by the computer, as the time-series pattern acquired in a same environment.

3. The driving assistance system according to claim 1, further comprising:
  a map comprising sections,
  wherein the computer is further programmed to divide the driving information for each section on the map, and calculate the time-series pattern for each section by using the driving information divided for each section.

4. The driving assistance system according to claim 1, wherein the computer is further programmed to:
  calculate the time-series pattern of the driving information regardless of sections on the map,
  determine to which one of a plurality of preset time-series patterns the time-series pattern calculated by the computer corresponds, and
  associate the driving information with the time-series pattern determined by the computer.

5. The driving assistance system according to claim 1, wherein the computer is further programmed to:
  provide attributes to the driving information acquired by the computer, and
  statistically process the driving information as the time-series pattern, for each of the attributes provided by the computer.

6. The driving assistance system according to claim 1, wherein the computer is further programmed to combine the vehicle location information and the statistical information.

7. The driving assistance system according to claim 1, wherein the computer is further programmed to probabilistically predict a following time-series pattern of the driving information from the time-series pattern of the driving information.

\* \* \* \* \*